No. 627,629. Patented June 27, 1899.
H. W. VOSS.
CAMERA SUPPORT.
(Application filed Feb. 16, 1898.)
(No Model.) 2 Sheets—Sheet 1.

Witnesses
Inventor
Herman W. Voss
his Attorney

THE NORRIS PETERS CO., PHOTO-LITHO., WASHINGTON, D. C.

No. 627,629. Patented June 27, 1899.
H. W. VOSS.
CAMERA SUPPORT.
(Application filed Feb. 16, 1898.)

(No Model.) 2 Sheets—Sheet 2.

Witnesses: Inventor
Herman W. Voss
by Rich'd N. Dyer
Att'y.

THE NORRIS PETERS CO., PHOTO-LITHO., WASHINGTON, D. C.

United States Patent Office.

HERMAN W. VOSS, OF NEW YORK, N. Y.

CAMERA-SUPPORT.

SPECIFICATION forming part of Letters Patent No. 627,629, dated June 27, 1899.

Application filed February 16, 1898. Serial No. 670,480. (No model.)

*To all whom it may concern:*

Be it known that I, HERMAN W. VOSS, a citizen of the United States, and a resident of New York city, in the county and State of New York, have invented a certain new and useful Improvement in Camera-Supports, of which the following is a specification.

The object of my invention is to provide an adjustable support for cameras, whereby the camera may be readily adjusted to any angle relative to the support, and thereby avoid the necessity of adjusting the legs of the tripod, and also with means for permitting the camera to be rotated on its support without disturbing its angular adjustment.

In carrying my invention into effect I provide a universal joint between the camera-base and the support or tripod, a device for locking the universal joint to lock the camera in the adjusted position, and a support upon which the universal joint may be rotated, so that the camera may be moved over a wide range without disturbing its adjustment.

My invention is illustrated in the accompanying drawings, in which—

Figure 1:
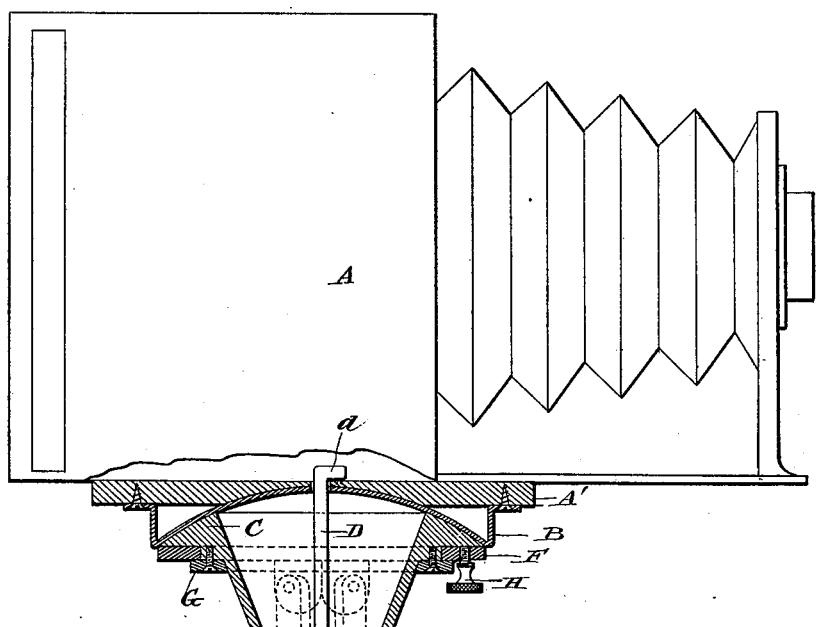
Figure 2:
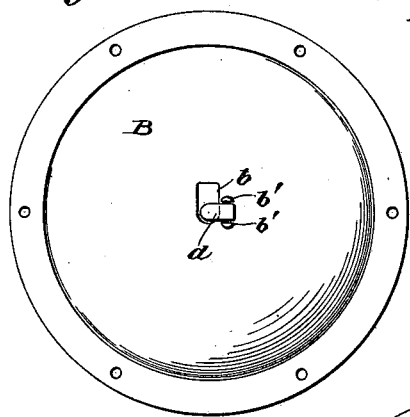
Figure 3:
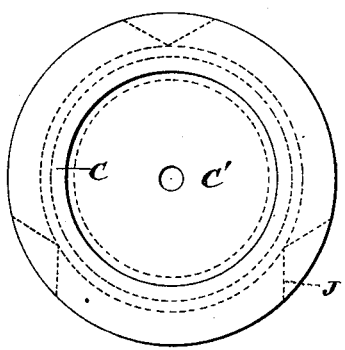
Figure 4:
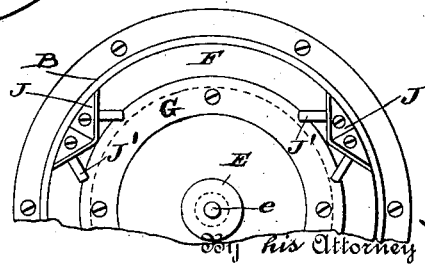
Figure 5:
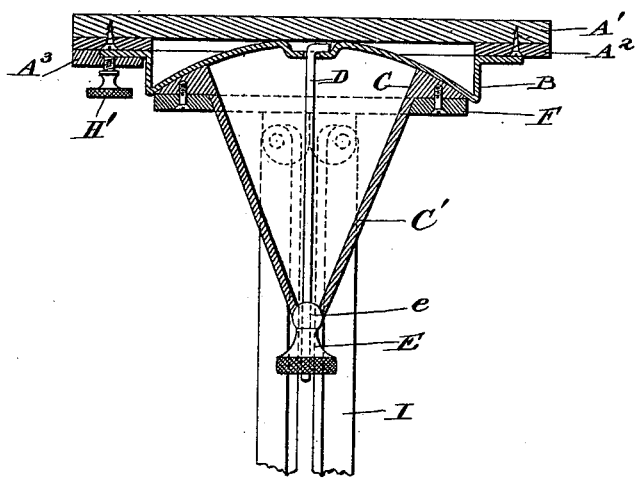

Figure 1 is a side elevation and partial vertical section; Fig. 2, a top view of one part of the universal joint; Fig. 3, a top plan view of the other part of the universal joint; Fig. 4, a partial bottom plan view of the tripod-plate; Fig. 5, a sectional view of a modification of the form shown in Fig. 1, and Fig. 6 a bottom plan view of same.

Referring to Figs. 1 to 4 of the drawings, A represents the camera, having a base-board A', to which is secured a concave plate B. This plate is seated on a convex support C, which is in the form of a hollow cone, through which passes a rod D, having a hooked end $d$, which is passed through an opening $b$ in the concave plate B and turned so as to rest between the two projections $b'$. The lower end of the rod D is screw-threaded and receives a thumb-nut E, having a spherical end $e$, which is screwed against the concave seat formed at the lower end of the cone C' to clamp the concave and convex members B and C together. The convex member C is seated upon a ring or base plate F and held in position thereon by a ring G, which is secured to the member C by screws or in any other suitable way. The member C is free to rotate on the ring F to revolve the camera on its support or tripod without disturbing its angular adjustment.

H is a thumb-screw adapted to be screwed against the under side of the member C to clamp the same in position when desired.

The legs I of the tripod, which may be of any suitable form, are attached to the ring F by means of plates J, having pins J', upon which the legs are pivoted.

In Fig. 1 the camera is shown in a horizontal position, and to adjust it at any desired angle or to return it to the horizontal from an angular position the thumb-nut E is screwed down to unlock the members B and C, whereupon the camera may be tilted upward or downward. The camera when adjusted is locked in position by screwing the thumb-nut upward to firmly clamp the members B and C together. To rotate the camera, the thumb-screw H is loosened, so as to permit the member C to rotate upon the ring or base F.

To remove the camera from the tripod, the thumb-nut E is screwed down a sufficient distance, so that the rod D can be raised and its hooked end $d$ disengaged from the lugs $b'$, and then by turning the rod the hooked end will drop through the opening $b$, when the camera, with the concave member B, is free to be removed from the tripod. It will be evident that instead of securing the concave member B to the base-board A' of the camera the board A' may form part of the universal joint or support, as shown in Fig. 5, and that a camera may be clamped to the board A' in any suitable manner.

Figure 6:
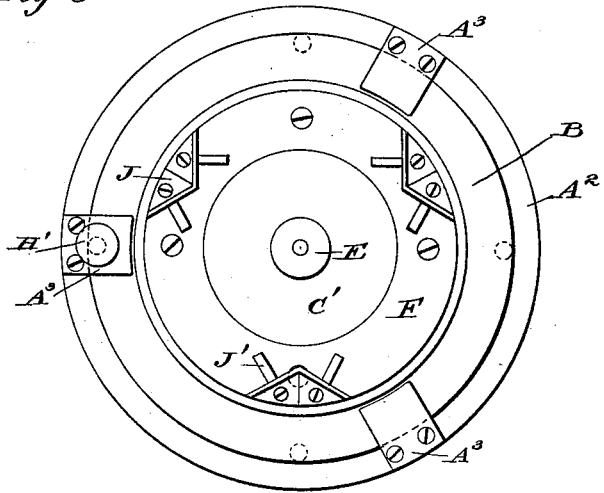

In Figs. 5 and 6 the concave member is not rigidly attached to the board A', as in Fig. 1, and the rotary movement of the camera is obtained by rotating the board A' on the member B instead of rotating the member C upon the ring F. For this purpose the board A' is provided with a ring $A^2$, which rests upon the flange of concave member B and held in position by three clips $A^3$, which permit a rotary movement of the board upon member B. To clamp board A' in position, one of the clips is provided with a thumb-screw H', which forces the flange of member B firmly against ring $A^2$. The convex member C is secured upon the ring F, to which the legs I of the tripod are pivoted. The concave and convex members are clamped in their adjusted positions by rod D and thumb-nut E, which devices are arranged and operated as in Fig. 1.

What I claim is—

1. The combination in a camera-support, of a camera-supporting board, a concave joint member rigid in said board, a convex joint member engaging the same, the two joint members being relatively movable, a radial clamping-rod engaging the concave joint member, an adjusting-screw on the clamping-rod, an element carried by the convex joint member and with which said adjusting-screw engages to clamp the two ends together, and a relatively stationary ring on which the convex joint member is mounted and with respect to which said joint member is rotatable, substantially as set forth.

2. The combination, in a camera-support, of a camera-supporting board, a concave joint member rigid in said board, a convex joint member engaging the same, the two members being relatively movable and the convex member being provided with a hollow conical extension, a clamping-rod in said conical extension engaging the concave joint member, an adjusting-screw on the lower end of said clamping-rod, and a spherical end on said adjusting-screw engaging the lower end of said conical extension, substantially as set forth.

3. The combination, in a camera-support, of a camera-supporting board, a concave joint member rigid in said board, a convex joint member engaging the same, the two joint members being relatively movable and the convex member being provided with a hollow conical extension, a clamping-rod in said conical extension engaging the concave joint member, an adjusting-screw on the clamping-rod engaging the said conical extension to clamp the two members together, and a relatively stationary ring on which the convex joint member is mounted and with respect to which the said joint member is rotatable, substantially as set forth.

4. The combination, in a camera-support, of a camera-supporting board, a concave joint member rigid in said board, a convex joint member engaging the same, the two joint members being relatively movable and the convex member being provided with a hollow conical extension, a clamping-rod in said conical extension engaging the concave joint member, an adjusting-screw on the clamping-rod engaging the said conical extension to clamp the two members together, a relatively stationary ring on which the convex joint member is mounted and with respect to which the said joint member is rotatable, and means for locking the convex joint member to said ring, substantially as set forth.

This specification signed and witnessed this 31st day of January, 1898.

HERMAN W. VOSS.

Witnesses:
   H. F. METCALF,
   J. W. WOOD.